G. H. TABER, Jr.
MANUFACTURE OF GASOLENE.
APPLICATION FILED APR. 6, 1917.
1,390,472.
Patented Sept. 13, 1921.
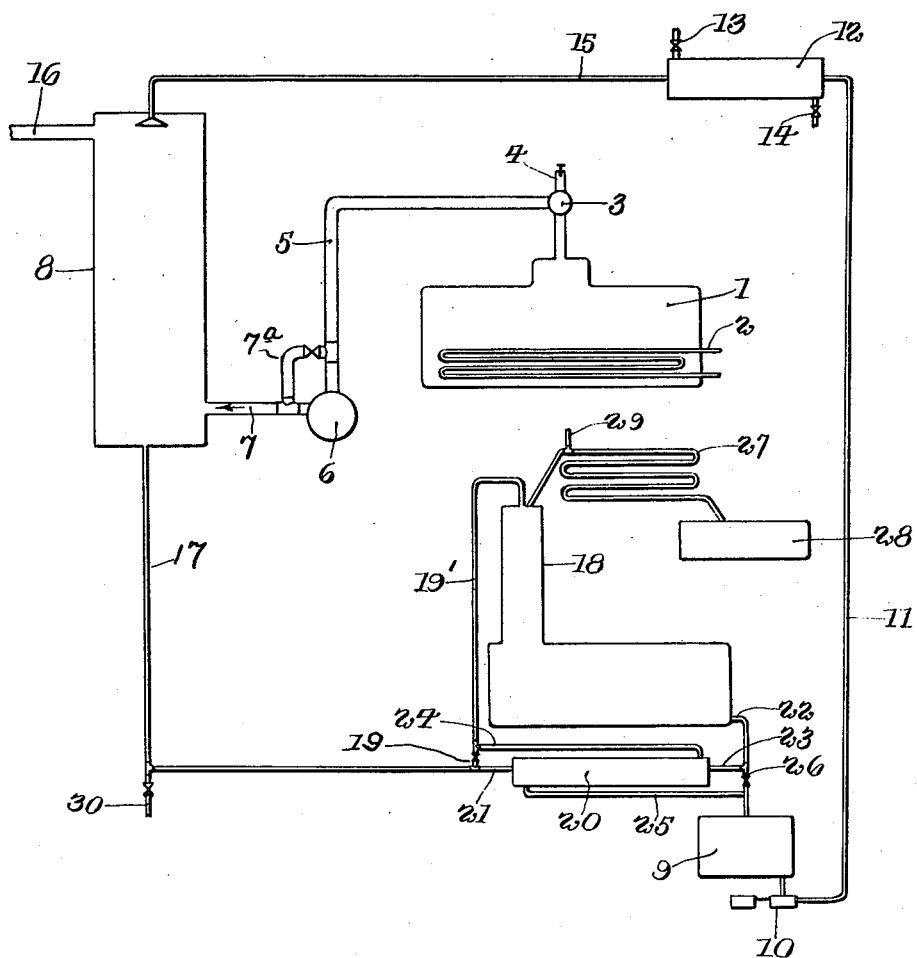
Witness
George G. McDaniel
Inventor
George H. Taber, Jr.
By W. P. McElroy
Attorney

UNITED STATES PATENT OFFICE.

GEORGE H. TABER, JR., OF PITTSBURGH, PENNSYLVANIA, ASSIGNOR TO GULF REFINING COMPANY, OF PITTSBURGH, PENNSYLVANIA, A CORPORATION OF TEXAS.

MANUFACTURE OF GASOLENE.

1,390,472.           Specification of Letters Patent.      Patented Sept. 13, 1921.

Application filed April 6, 1917. Serial No. 160,186.

*To all whom it may concern:*

Be it known that I, GEORGE H. TABER, Jr., a citizen of the United States, residing at Pittsburgh, in the county of Allegheny and State of Pennsylvania, have invented certain new and useful Improvements in the Manufacture of Gasolene, of which the following is a specification.

This invention relates to the manufacture of gasolene; and it comprises a method of recovering gasolene suitable for use in ordinary engines and for the ordinary purposes wherein casinghead gasolene or natural gasolene of the type which is known as "wild," that is the type which gives a free evolution of vapors at ordinary temperatures, is weathered, warmed or otherwise treated to expel such vapors, the heavier vapors are absorbed by a heavy or high boiling petroleum oil or other oil, such as fatty oils or coal tar oils in a suitable way and said heavier volatile absorbed oils are thereafter recovered from the high boiling oil by distillation; all as more fully hereinafter set forth and as claimed.

There are many processes in use for recovering low boiling hydrocarbons of the kind known as gasolene from natural gas, etc. Natural gas for the present purposes, may be considered as mostly composed of gaseous hydrocarbons, mainly methane or $CH_4$ with usually some ethane. Many such gases also carry vapors of condensable hydrocarbons ranging in volatility from those whose vapors in a pure state will only condense at temperatures around the freezing point of water to those with much higher boiling points. All these condensable hydrocarbons have a relatively high vapor tension and in the natural gas they are kept in vapor form by the fact that they are present in relatively small amounts. The methods now in use for recovering these condensable hydrocarbons depend on a number of different principles and are carried out in a number of ways; but broadly speaking the gas is subjected to refrigeration or compression, or, and generally, both. Sometimes the gas is washed with a high boiling oil from which the absorbed volatile bodies are afterward driven off by heating and condensed by cold or pressure, or both. The gasolenes so obtained are of a character which is known in the trade as "wild"; that is, they give off great amounts of gases and vapor at ordinary atmospheric temperatures and, in many cases, they can be made to boil by the heat of the hand. They are, of course, saturated solutions of the permanent gases of the natural gas. The natural gas gasolenes or casing-head gasolenes therefore are ordinarily subjected to a weathering process; that is, they are somewhat warmed or are treated by a current of air to remove the more volatile portions. In so doing, however, not only are the gases in solution and the very volatile gasolenes removed but also a substantial proportion of the less volatile gasolenes which, by themselves, are not of "wild" character. This is because of the stated vapor tension phenomena. On condensing, by cold or pressure, the vapors from the weathering of a wild gasolene the condensate as a whole will again volatilize on re-weathering. That is, the heavier volatile hydrocarbons which are removed in weathering cannot be simply regained by re-weathering the condensed products of the first weathering.

In the present invention I have devised a method of obviating this source of loss. In the present invention I weather a casinghead gasolene or natural gas gasolene in any of the usual ways, but instead of trying to condense the evolved vapors by cold or pressure, I pass them through a heavier mineral oil, such as naphtha, kerosene, light lubricating oil, etc.; ordinarily using an amount of this oil insufficient to condense and absorb all the gases and vapors; giving, so to speak, a fractional absorption. Under these conditions the gases and the lighter or more volatile liquid hydrocarbons pass onward while the more valuable heavier gasolenes are retained by the oil. Or, if sufficient oil be used to absorb all the vapors after weathering, on subsequently slightly heating the oil the lighter hydrocarbons can be first expelled and subsequently the heavier gasolenes. Either way allows me to produce what may be called a fractional separation of the more and the less volatile hydrocarbons of the vapors from weathering casing-head gasolene.

Many specific embodiments of my general process utilizing the described principles may be provided. In one such embodiment, I weather the casinghead gasolene in any ordinary apparatus and pass the vapors against a countercurrent of absorbent oil in any suitable apparatus permitting intimate contact between gases and liquids, such as the ordinary scrubbing towers. In so doing, the amount of oil relative to the amount of vapors may be only that which will absorb the heavier hydrocarbons, leaving the gases and lighter hydrocarbons to go off for utilization elsewhere. The oil in this event after passing from the base of the scrubber may be simply weathered to free it of such gases as it has absorbed and then distilled to regain gasolene. Or it may be heated in a suitable still and the receiver changed when the heavier gasolenes begin to come over. If enough oil is used in the scrubbing tower all the vapors may be absorbed. The oil in this event may be afterward weathered to remove the light vapors. In another embodiment of the present process in lieu of using scrubbers and the like, I may compress the vapors from weathering, as by cold and pressure, using any of the ordinary methods or apparatus utilized in producing the original casinghead gasolene. The condensate is now mixed with a small proportion of oil and the mixture treated as before. This gives the same result as the use of small quantities of oil in scrubbing in the manner previously described. In absorbing these vapors by oil I may operate under more than atmospheric pressure, at atmospheric pressure or at less than atmospheric pressure. Similarly the temperature may be varied. The higher the pressure or the lower the temperature, the less is the amount of oil necessary to absorb and retain the heavier gasolenes.

It will be noted that in the described operation I am using the differential absorbing powers of a heavy oil to produce a separation between relatively light gasolene vapors and relatively heavy gasolene vapors in a mixture which cannot be usefully separated by differences in temperature or in pressure.

The gasolene produced by this process may be blended with naphtha or kerosene if desired, or the saturated absorbent oil itself may be shipped as a commercial article. The blending may be accomplished by running a stream of naphtha or kerosene into the condenser.

When kerosene, or more particularly naphtha, is used as the absorbent oil, the charged kerosene or naphtha may be used directly as a fuel in internal combustion engines, since the absorbed gasolene gives the mixture a low flash point.

The gasolene recovered in the present invention may at will be recovered of a variety of boiling points. All the gases and vapors produced in weathering wild gasolene are soluble in oil and it is a matter of choice as to how low boiling or low flashing the product recovered may be. Ordinarily, I recover a material with an initial boiling point of say, 70° F. or higher. The recovered material, because of its richness in hydrocarbons of low molecular weight, is a useful material for the commercial manufacture of these hydrocarbons. In practice, a fraction boiling between 25° and 45° C., which includes a large amount of pentanes, may be used for the production of amyl acetates and amyl alcohols by the modern synthetic methods. From such a fraction the various pentanes may be recovered, if desired, severally in a state of purity by appropriate fractionating methods. Or the fraction boiling between 25° and 45° C. may be used as it is for making synthetic amyl alcohol (fusel oil) and derivatives, such as commercial "amyl acetate." For this purpose, it is chlorinated and then the monochlorpentanes converted into alcohols or acetates, as the case may be.

In the accompanying illustration I have shown, more or less diagrammatically, certain apparatus useful in the performance of the described process. In the drawing, the casinghead gasolene is weathered in the tank 1 provided with closed steam coil 2. This tank has a main collecting pipe 3 and safety valve 4. From the weathering tank, the evolved vapors are passed by pipe 5 to a gas pump 6, which is used if the pressure of the vapors in the weathering tank is not sufficient to force them through the scrubber hereinafter referred to. From the gas pump by means of pipe 7, or directly from the weathering tank by means of the valved bypass 7ª and pipe 7, as the case may be, the vapors are passed to the lower end of a scrubbing apparatus 8 which may be in the form of the usual column filled with wooden grids, tiles or plates, or with coke or the like. The vapors in the scrubber are contacted with a heavier petroleum oil, such as naphtha, kerosene, or light lubricating oil, or if desired, with a fatty oil or a coal tar oil, which passes in an opposite direction to that of the flow of the vapors. This heavier oil, or a mixture of two or more of them, is conducted from the circulating tank 9 by means of circulating pump 10 through pipe 11 to a cooler 12. This cooler may be provided with cold water inlet 13 and outlet 14. From the cooler the absorbent oil is passed by means of pipe 15 to the top of the scrubber and may be sprayed over the plates, grids, tile or coke to contact with and absorb the vapors rising from the bottom of the scrubber. Vapors not absorbed escape from the outlet 16 of the scrubber to a point of use for burning or otherwise. The charged absorbent oils are conducted from the scrubber through pipe 17 either directly to the top of still 18 by means of bypass and pipe 19′ or to a heat interchanger 20 by means of pipe 21. From the heat interchanger, after absorbing some of the heat from the residual oil from the still which is delivered from pipes 22 and 23 to the heat interchanger, it may be conducted through pipe 24 to pipe 19' and thence to the top of the tower of the still 18. This still is a steam-heated still. The undistilled absorbent oil is delivered from this still through pipe 22 either to the heat interchanger as described and thence through pipe 25 to the circulating tank 9 or directly to the circulating tank 9, valve 26 serving to establish the proper communication. The distillates from the steaming are passed to a condenser 27 which may be water cooled or air cooled as desired and the gasolene is collected in the storage tank 28. When naphtha or kerosene is to be blended with the gasolene, it is advantageously admitted to the condenser by means of the inlet 29. When the charged absorbent oil is to be used directly, it may be removed from the system through the valved pipe 30. This is advantageous when kerosene or more particularly naphtha is used as the absorbent oil, since the mixture may be used directly as a fuel in internal combustion engines, the gasolene giving it a low flash point.

This drawing is more or less diagrammatic and serves to illustrate the process. Any type of weathering tank, gas pump, scrubber, cooler, circulating tank, heat interchanger, still, condenser and storage tank suitable for the purpose may be used. These are well known types of apparatus and they are therefore not shown in detail.

What I claim is:—

1. The process of recovering gasolene which comprises weathering casinghead gasolene to produce vapors of mixed relatively light and relatively heavy gasolene, regaining the heavy constituents of such vapors in solution in a heavier mineral oil, subsequently separating such heavier vapors from such mineral oil by distillation, and blending therewith another mineral oil.

2. The process of treating casinghead gasolene which comprises maintaining a body of mineral oil in cyclic circulation through an absorbent tower, a still and a cooler, warming casinghead gasolene to vaporize lighter constituents and passing the vapors of said lighter constituents into contact with said cyclically circulating body of oil in the absorbing device, the amount of such vapors relative to the amount of such oil being sufficient to allow the absorption of only a portion of such vapors by such oil.

In testimony whereof I affix my signature.

GEORGE H. TABER, Jr.